United States Patent
Snowdon et al.

(10) Patent No.: US 6,671,737 B1
(45) Date of Patent: Dec. 30, 2003

(54) DECENTRALIZED NETWORK SYSTEM

(75) Inventors: Dave Snowdon, Grenoble (FR); Natalie S. Glance, Meylan (FR)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/404,175

(22) Filed: Sep. 24, 1999

(51) Int. Cl.[7] .................................. G06F 15/16
(52) U.S. Cl. ........................ 709/243; 709/229
(58) Field of Search .......................... 709/243, 219, 709/229, 227, 213; 710/62; 344/463; 340/539

(56) References Cited

U.S. PATENT DOCUMENTS

| | | | | |
|---|---|---|---|---|
| 5,225,826 A | * | 7/1993 | DeLuca et al. | 340/825.84 |
| 5,555,346 A | * | 9/1996 | Gross et al. | 706/45 |
| 5,555,376 A | * | 9/1996 | Theimer et al. | 709/229 |
| 5,717,955 A | * | 2/1998 | Swinehart | 710/62 |
| 5,969,678 A | * | 10/1999 | Stewart | 342/463 |
| 6,137,864 A | * | 10/2000 | Yaker | 379/88.2 |
| 6,167,428 A | * | 12/2000 | Ellis | 709/209 |
| 6,356,192 B1 | * | 3/2002 | Menard et al. | 340/539 |
| 6,360,264 B1 | * | 3/2002 | Rom | 709/227 |

OTHER PUBLICATIONS

Watson, Application Design for Wireless Computing, 1994.*

Kirsch, D. and Starner, T., "The Locust Swarm: An environmentally–powered, networkless location and messaging system", 1997.

Mayo, B., "What is a Factoid?", Compaq, Western Research Laboratory, http://www.research.compaq.com/wrl/projects/Factoid/index.html, 1999.

* cited by examiner

*Primary Examiner*—Zarni Maung
(74) *Attorney, Agent, or Firm*—Jeannette M Walder

(57) ABSTRACT

A decentralized network system provides for the distribution and collection of information (or messages) without the constraints of a large physical infrastructure. A decentralized network system includes a plurality of first nodes, each first node having a memory for storing messages, a processor for processing messages in accordance with a predetermined relationship and a communications port for transmitting and receiving messages. The first nodes are attached to some physical device or to a location. A plurality of mobile second nodes is also provided. Each second node includes a memory for storing messages, a processor for creating messages in response to user input and for processing messages in accordance with a predetermined relationship and a communications port for transmitting and receiving messages. Preferably, each second node is a personal digital assistant (PDA). The mobile second nodes are moved by users, who provide the means for transmitting messages from one first node to another first node. Transmission of a message from one node to another node is accomplished through a sequence of message exchanges between pairs of first nodes and second nodes.

24 Claims, 8 Drawing Sheets

DECENTRALIZED NETWORK SYSTEM

FIELD OF THE INVENTION

This invention relates generally to networking systems, and more particularly, to a decentralized network system for networking heterogeneous devices which operates without a physical infrastructure and to a method of managing message exchanges between nodes in a decentralized network system.

BACKGROUND OF THE INVENTION

The value of networking in business via intranets and for personal use via the Internet is undisputed. Networking enables large numbers of people and equipment to work cooperatively together at multiple locations. Traditional networking involves dedicated servers, workstations and wired transmission media. Wireless communication provides some flexibility in traditional network systems. However, infrared (IR) media requires a clear line-of-sight between transmitter and receiver. Radio frequency (RF) communication avoids line of sight problems, but RF devices have relatively high power consumption, requiring either access to AC power or frequent battery replacement. Traditional networks involve substantial infrastructure, but do not provide for all networking needs.

Devices such as printers, workstations, mobile workstations and other devices are frequently networked using traditional means. However, many pieces of electronic equipment cannot be networked using traditional means; they are either too rudimentary to justify the cost of a network connection or are not compatible with the network protocol. Even those devices that are networked communicate via different protocols, requiring servers to translate and pass on messages and information from such devices.

There is a large volume of information pertaining to electronic devices (e.g., photocopiers, facsimile machines, video conferencing suites), which is not available in a traditional network system. Many of these devices are used infrequently, so users are not familiar with their operation, necessitating access to the device's manual. Most of the devices have operations manuals that are provided in a hard copy form and ideally located near the device. However, manuals may get lost or "borrowed," or there may be no convenient place to keep them, or they are not available for viewing when needed. While it might be desirable to have all device manuals located on a network, it is generally not considered practical.

In addition to the information available in manuals, there is often a body of informal knowledge associated with complex, old and/or temperamental devices. However, even if this informal information is recorded, it may be stored in someone's office or on the web but probably not where it is needed, namely next to the device itself.

In a complex work environment, it is common for devices not to function as expected. Depending on the device's user-interface, such as a printer, it may not be clear why the device is not functioning. If a device does have a problem, the user would like to find possible fixes or alternative working devices or to be able to inform support personnel. Even in the case of a networked printer, the user will not know if other networked printers are available without returning to a workstation or calling and finding the location of a working printer.

In general, devices support specific kinds of tasks in a generic way. Within any given organization, devices tend to be used in ways that are specialized for the organization or for a particular group of people. For example, most phone calls will be to internal numbers. However, apart from specially programmed numbers, the telephones are not equipped to provide this specialization. A common solution is to provide a directory of phone numbers, which will not necessarily be ready-at-hand when the task of reaching someone occurs.

Various unstructured network systems have been developed to satisfy some of the functions not available with a traditional network system. For example, the Locust Swarm (T. Starner, D. Kirsh, S. Assefa, "The Locust Swarm: An Environmentally-powered, Networkless Location and Messaging System," IEEE International Symposium on Wearable Computing, October 1997) uses solar powered devices positioned in buildings to store annotations and provide location information to users via their wearable computers. The Locust Swarm uses wireless communications to transmit messages from a passing user's wearable computer to an overhead infrared transceiver. While the Locust Swarm suggests using the individual IR transceivers to transmit messages by downloading to passing users, no method of managing message exchange or implementation is described.

Borovoy, R., Martin, F., Vemuri, S., Resnick, M., Silverman, B., Hancock, C. "Meme Tags and Community Mirrors: Moving from Conferences to Collaboration," in proceedings of CSCW'98, November 1998, Seattle, USA, pp. 159–168, describe a device called a Meme Tag. The Meme Tag allows small textual messages to be passed among users via user-worn badges which communicate via infrared.

In the Factoid Project (http://www.research.digital.com/wrl/projects/Factoid/index.html), a user carries a tiny device that receives very small messages from other similar devices via short-range radio and stores them until they can be downloaded. Whenever the Factoid device comes within range of an Internet connected server, the information is passed on to the server, which uploads the messages to a special database associated with the user. Since the messages are small (on the order of 200 bytes), the Factoid Project contemplates that they are never deleted but will serve as a permanent record of the things that the person has encountered throughout life.

Local area wireless networks have been suggested as alternatives to traditional network systems. For example, Bluetooth (http://www.bluetooth.com/) is working on a short-range (~10 m) radio based network technology. Bluetooth envisions using this technology to provide networking between many devices both in the home and office, including: components of home-stereo systems, mobile phones and personal digital assistants (PDAs), computer peripherals, and domestic appliances, such as refrigerators (for inventory control and communication), and washing machines (for communicating malfunctions to centralized service).

Another proposed alternative to a traditional network system involves using standard domestic power lines. Domestic power lines is a ubiquitous technology that was tried many years ago. In principle, anything plugged into the power mains can communicate with any other plugged-in device. However, such a network cannot handle communication across anything outside a home or a building and battery-powered or non-electronic devices cannot be easily networked.

There is a need for an inexpensive, decentralized network system for networking large numbers of small electronic devices without a substantial infrastructure. There is a need for a network system that can easily handle battery-powered devices or unpowered devices. There is a need for a network system that avoids the problems of line of sight and high power consumption. There is a need for a network system that can provide information pertaining to specific networked devices at the specific device. There is a need for a network system that can easily store informal information about a device at the device location. There is a need for a method of managing message exchanges in a decentralized network system.

SUMMARY OF THE INVENTION

A decentralized network system according to the invention provides for the distribution and collection of information (or messages) without the constraints of a large physical infrastructure. A decentralized network system according to the invention includes a plurality of first nodes, each first node having a memory for storing messages and a communications port for transmitting and receiving messages. Preferably, the first nodes may also include a processor for processing messages in accordance with a predetermined relationship. The first nodes may be attached to some physical device, such as a printer, facsimile, telephone or a book. They may also be attached to a location such as a room, reception area or building or to a mobile object such as child, pet, car, or book. The first node may be an iButton, a miniature computer, battery operated and encased in steel, as manufactured by Dallas Semiconductor. Preferably, the first node's predetermined relationship stores and deletes messages based on relevance to the device or location to which the first node is attached and based on available memory space in the first node memory.

A plurality of mobile second nodes is also provided. Each second node includes a memory for storing messages, a processor for creating messages in response to user input and for processing messages in accordance with a predetermined relationship and a communications port for transmitting and receiving messages. The mobile second nodes are moved by users, who provide the means for transmitting messages from one first node to another first node. Preferably, each second node is a personal digital assistant (PDA) or wearable computer. Users or administrative software services may create messages, which are first stored in the second node and then downloaded to a first node. Alternatively, messages may be generated by the device or location to which a first node is attached or associated with and stored in the first node. Preferably, the second node's predetermined relationship stores and deletes messages based on relevance to the anticipated first nodes to which the second node's user may travel and based on available memory within the second node. The messages carried within nodes of the second kind may be either visible or invisible to the user associated with the second node.

Messages may be stored in the memories of first nodes or second nodes. For example, a user may wish to record a message about a particular device, such as "this printer is not working" or the user may wish to leave a message for another user at his workstation. Messages pertaining to informal knowledge about the device may also be stored in the first node for ready access by a user. The user first creates the message on his PDA. The user then couples his PDA to the iButton associated with the device or location to which he wishes to store the message. Messages may be transmitted by docking the PDA to the iButton via a receptor or using some other traditional transmission media. If the message pertains to the device, no further transmission is required. Later, users docking with the first node may read the message.

If the message is intended for a different first node or second node, transmission of the message from one node to another node is accomplished through a sequence of message exchanges between pairs of first nodes and second nodes and between pairs of second nodes. This is accomplished by the movement of users carrying a second node and communicating selectively with first nodes.

A message includes both content and information representing the message's transmission status or state. Transmission status or state may be one of new, in transit, delivered or expired. When a user creates a message, its status is new. Also, when a message is copied, the status of the copy is new. When the message is transferred to any node, not the destination node, its status is in transit. When the message is delivered to the destination node, its status is delivered. Note that destination nodes are either first nodes or second nodes.

Since more than one second node may download the message, several copies of the message may be in existence. This redundancy helps in ensuring that the message is received by the intended node. The first nodes and the second nodes typically have only a limited memory available for the storage of messages. Since some messages (or copies of a message) may not make it to their destination node and to avoid overloading the system with messages, each message will have an expiration date. When a message status is expired, the message may be deleted by any receiving node.

In a preferred embodiment, the decentralized network system will include a third node, which serves a capacity similar to a server in a traditional network. Second nodes may communicate with the third node periodically and download all messages stored in their memories. The third node (also called a hive) stores or archives all such downloaded messages in a master database. The third node may also act as an intelligent communications hub and administrative system. Preferably, each second node maintains a log of the first nodes it has visited since it last made contact with the third node. These logs allow the third node to learn the most probable routes that a given user (and the second node) will take and the nodes that the user (second node) is most likely to visit. This information can be used by the third node to select which second node to give a particular message, thereby optimizing the network throughput and minimizing the number of messages that each individual second node must carry.

The system of the invention can be analogized to the way bees pollinate flowers. In the course of their workday, people move from device to device and from location to location, just as bees move from flower to flower in a field in search of nectar. When a bee visits a flower, it inevitably collects pollen on its body and, when it moves to a different flower, some of this pollen rubs off. Several bees may visit the same flower, in which case pollen from each bee rubs off onto the flower, providing "redundant pollen." The movement of the bees is relatively random, but most flowers get pollinated.

In the invention, people (i.e., users) carry an electronic form of pollen (messages) with them, not on their bodies, but inside their wearable computers or PDAs (such as Palm Pilots, Psions, etc.). Devices and spaces can be made pollen-ready by affixing suitably programmed autonomous miniature computers, such as iButtons, to them. Optionally, an organizational memory, referred to as the hive, which may be resident on an organization's existing traditional network, may be used to provide centralized storage of pollen (information and messages) and a method of controlling the distribution of information. Messages are transmitted from one node to another node by the relative random movement of the second nodes resulting in message exchanges with first nodes.

An important benefit of the invention is that information can be transferred to arbitrary locations without the need for either a physical or a wireless (radio or infrared) infrastructure. The decentralized network system preferably employs very low cost devices such as iButtons, that are durable, have a long life expectancy and can be used either indoors or outdoors, for the first nodes and personal digital assistants for the second nodes. The administration effort required to maintain a decentralized network system is minimal.

The decentralized network system also makes it possible for users with mobile devices to participate in multiple "virtual networks" without reconfiguring firewalls (the standard security measures employed by fixed networks). Unlike wireless networks, the decentralized network system is immune to electronic eavesdropping. First, the range of transmission can be minimized. Transmission of messages between iButtons and PDAs may be accomplished by docking the PDA to the iButton through a receptor. Alternatively, very short range (IR or RF of the range of inches to a few feet) may be used. Additionally, individual first nodes and second nodes can be encrypted so that only specifically encrypted nodes can receive and download messages. This also ensures that there is no crosstalk between the virtual networks.

The decentralized network system makes it possible for information to be shared and distributed where needed simply by the everyday actions of groups of users. The users need not be aware of how the distribution is taking place or of the details of their participation in the process. Information, such as hints, tips and other comments, can be associated with physical objects in the work environment and made easily available to colleagues by storing them in the first nodes (e.g., iButton), ready for reading by a user with a PDA (second node).

In the same way, when a user visits a device, not only can the user leave comments on the associated first node (iButton), but the first node can also transfer messages (created by another user) to the user's PDA. The messages transmitted to the second node may be either visible or invisible to the user, depending on their relevance to the user. Relevance depends on both the person's identity and the current context. Users may be notified, for example, about messages addressed specifically to them or pertaining to their current location. When the user next visits another device, the messages stored in the PDA can then be selectively passed along. Through the cumulative actions of many people interacting with many devices in this way, messages are transferred node-by-node across the network.

Not only may electronic devices be networked, but also any physical space or object, such as meeting rooms, offices, and even non-electronic devices such as filing cabinets, bookcases, books may be networked. When a person wishes to use a meeting room that is currently empty, his/her PDA can download information from the meeting room's iButton informing him/her whether the meeting room is already booked.

The decentralized network system provides another advantage in communication. When a user arrives at a colleague's office and finds him/her absent, the user can create a pollen message on his/her PDA and then download the pollen onto the colleague's iButton attached to his/her office. Thus, the user can leave a signed message that only the colleague is able to read (unlike with post-it notes). The user may also download from the colleague's iButton onto the user's PDA any pollen pertaining to information available concerning the colleague's whereabouts and schedule.

When a hive or third node is included as part of the decentralized network system, the hive acts as an organizational memory tracking the expiration dates of the messages stored in it. When a message "expires" or becomes obsolete, the organizational memory can transfer commands to a docked PDA (second node) instructing it to delete the particular message when the user's PDA next encounters the specified first node. If no hive is present, any first node or second node may delete an expired message resident in its memory. An organizational memory or hive also allows users to obtain an overall view of the messages/information in the decentralized network system and to centrally update this information, for example, to produce new manuals or Frequently Asked Question (FAQs) lists to be associated with particular devices, or to perform distributed diagnosis.

In some decentralized network systems, it may be appropriate to provide more than one hive. Different organizational memories, or hives, could handle different classes of information with different propagation characteristics. For example one organizational memory might only handle local site information while another might handle company-wide information.

To facilitate transfer of message in the decentralized network system, each first node and each second node (and the third node, if present) must operate in accordance with a predetermined method or process of creating, storing and handling messages. The methods are preferably implemented, in a preferred embodiment of the invention, as an application program or a cooperative set of application programs executed on the first nodes, the second nodes and the hive, if a hive is present in the system.

BRIEF DESCRIPTION OF THE DRAWINGS

FIG. 2a is a perspective view of a receptor for connecting a first node and a second node and FIG. 2b is a schematic of the circuit operating the receptor in FIG. 2a;

DETAILED DESCRIPTION OF THE PREFERRED EMBODIMENTS

Figure 1:
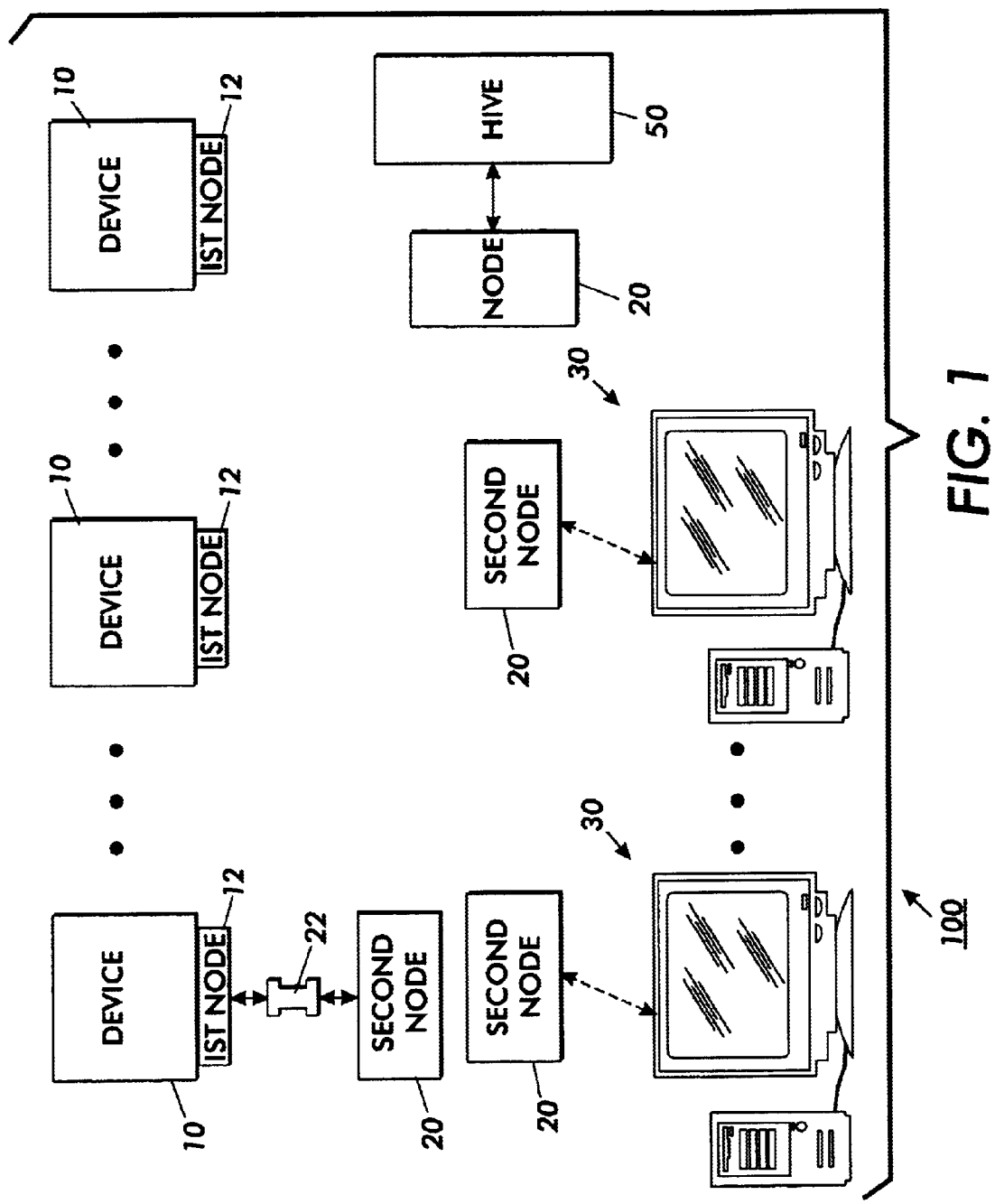
FIG. 1 is a block diagram of a decentralized network system according to the invention.

Referring to the drawings, and now in particular with reference to FIG. 1, a decentralized network system or pollen network is shown therein and referred to by reference numeral 100. System 100 provides for the transfer and exchange of messages or pollen. System 100 includes a plurality of first nodes 12, a plurality of second nodes 20 and a third node or hive 50. Each first node 12 is associated with a device or location designated by 10. As noted above device 10 may be a printer, facsimile machine, book or the like.

Location 10 may be a room, area or building. Each first node 12 preferably includes a miniaturized computer, such as an iButton, with a processor and dedicated memory for storing messages and a communications port. However, the first node need not have a processor; it may have only a dedicated memory and communications port. If the first node has a processor, then it is programmed with a predetermined routine which determines which messages it will accept for storage and the priority for storing messages in light of the limited storage capacity of its memory.

Each second node 20 is associated with a user and includes a processor and dedicated memory for storing messages and a communications port. Preferably each second node 20 is a wearable computer or otherwise suitably portable computing device, such as a personal digital assistant (PDA). In the simplest sense, the second node acts as a generic interface that extends the built-in interface of any pollen-equipped device to the network. Given a world in which more and more people are carrying around PDAs, this is an inexpensive way to build a new interface solution from existing devices in the office and home environments.

The PDA processor is programmed with a predetermined routine that determines which messages it will accept and the priority for storing messages in light of its memory's limited capacity. The PDA processor may also be programmed with a predetermined routine that determines which messages a communicating first node will accept with what priority, in light of the first node's limited storage capacity. The PDA processor is also programmed to create messages in response to a user's input. Each user may optionally have a workstation 30, which may be a standalone personal computer or a workstation associated with a conventional network. The user may wish to download messages on his/her workstation 30. Messages are transmitted from first node to second node when the first node and second node dock together. Preferably, this docking occurs with a receptor 22. Each user may dock his/her PDA 20, from time to time, with the network 100's hive or third node 50 via a networked personal computer or workstation.

Although the preferred embodiment contemplates using iButtons and PDAs, the pollen network may use alternative devices. Examples of alternative devices include very short range infrared devices. In addition to PDAs, pollen can also be carried by mobile iButtons (e.g., Java Rings and smart cards). These mobile iButtons are likely to be used to certify identity and authenticate transactions. Examples of applications for such mobile iButtons as second nodes include entry into physical spaces (buildings) and virtual spaces (WWW sites), electronic commerce, workflow transactions.

Figure 2A:
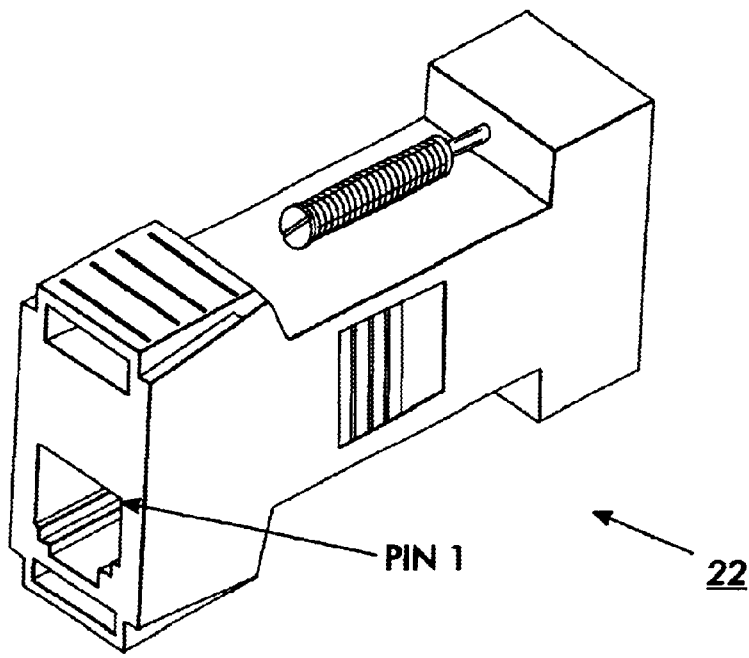
Figure 2B:
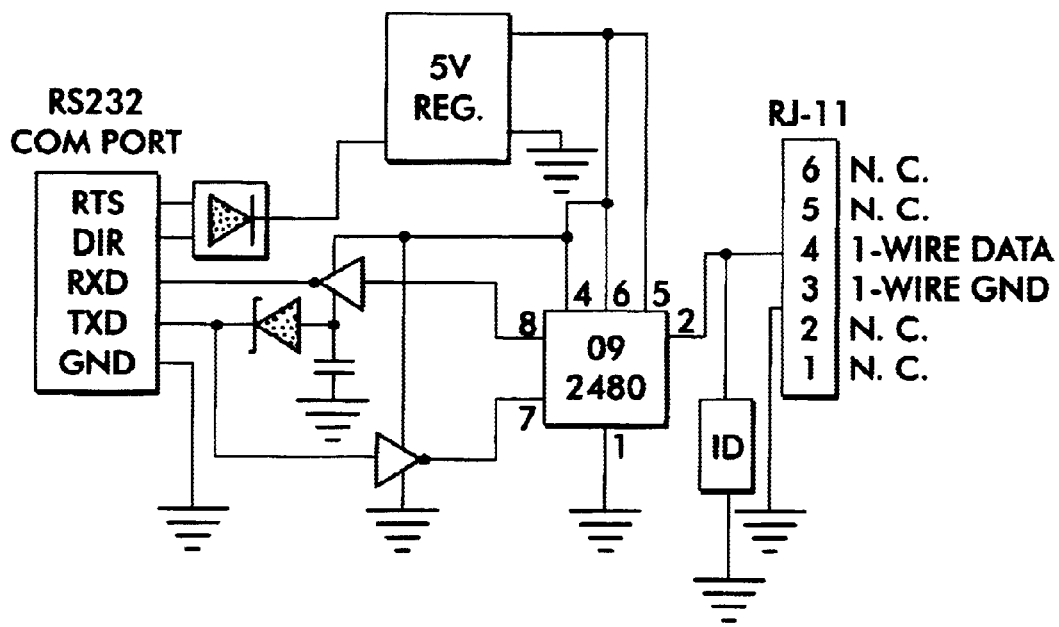

Referring to FIGS. 2a and 2b, receptor 22 includes an RS-232 port 26 for connecting with second node 20 and an RJ-11 port 24 for connecting to first node 12. Connecting to the hive 50 can occur either by physical docking (such as through an RS-232 comm port, receptor or other physical connection) or via infrared connection to personal workstation.

While in some networks 100, dedicated PDAs may be employed, it is contemplated that many networks 100 will include participating users who will have their own personal PDA. Participating users in the network 100 must agree to set aside a portion of PDA memory for caching messages (pollen) and for pollen user interfaces (for creating pollen, reading pollen and modifying pollen). Similarly, the memory in the iButtons 12 affixed to devices 10 is divided into two portions: one holding a pollen processing routine with some rule-based behavior and the second caching pollen. The small memory size of iButtons, which is presently 64K, is the strongest constraint on the size of messages and applications that can be stored and run. As noted above, pollen can range from simple messages, such as "this printer is jammed!" to a complex diagnosis system specific to the device 10.

The network 100 includes many users equipped with PDAs so that the cross-pollination or message distribution and exchange occurs in a distributed and decentralized way. This approach is less complex and expensive than a traditional network, which would provide a centralized mechanism for updating all iButtons over a wired network. In addition to not requiring a physical network infrastructure, another advantage to the network 100 is that it is not restricted to a single organization. Multiple organizations (even homes) can use the same technology.

Unlike wireless networks based on radio or infrared technology, pollen (messages) is not susceptible to electronic eavesdropping. First, messages are only exchanged directly between devices using the receptor or very short range IR or RF transmission. Second, public-key encryption may be used to ensure that unauthorized nodes are not allowed to receive information. Also because messages follow unpredictable paths, potential eavesdroppers cannot be sure of catching all the traffic between two nodes or even knowing that a communication has occurred.

When a user approaches a device 10, the user can then download onto his/her PDA 20, from the device's iButton 12, pollen in the form of contextual information about the device (what it is, how to perform common operations, a Frequently Asked Questions list). If the device is not performing as expected the user can then view pollen stored on the device's iButton in the form of comments left by other users. The user may also create pollen in the form of additional comments or information for other users and for support personnel on his/her PDA and download his/her created pollen into the iButton's cache.

Contextual information pertaining to a particular device 10 is stored in the device's iButton. By attaching the receptor 22, a small interface, to a PDA, a user can read the information stored on the iButton to get contextual information about the device and leave comments behind for other users. Each pollen message, as further described below, will preferably contain the context, name of contributor, time and some text. Pollen containing comments can be permanent or ephemeral and have an expiry time so that comments that are no longer relevant can be automatically deleted. To simplify the process for the user a standard list of comments that can be selected with a single click may be provided. For example, a user may select a "me, too" option which lets them state their agreement with an existing comment.

Depending on the available memory on the iButton attached to a particular device, the iButton may include pollen in the form of an automated troubleshooting or help (similar to the wizards on MS operating systems) program, as a client-server application, with the iButton functioning as a server and the PDA functioning as a client. Alternatively, many small applications (such as Java applets) could be downloaded from the iButton to the PDA, or vice versa, as another kind of pollen message.

Figure 7:
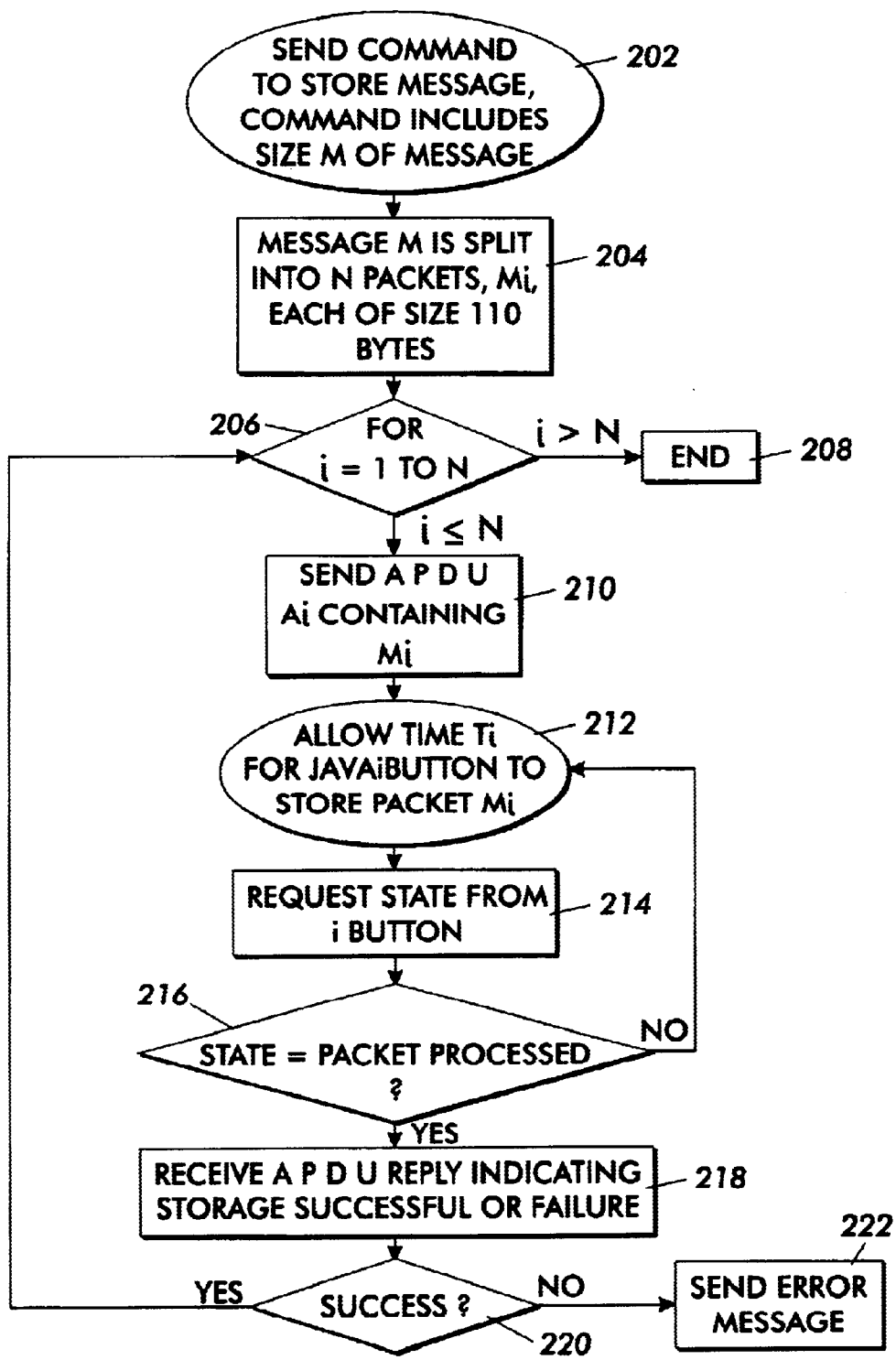
FIG. 7 is a flowchart of a method for storing a message in a first node.

When a user with a second node or PDA approaches a device with a first node or iButton and wishes to store a message, the user first creates a message on his/her PDA, then couples his/her PDA with the iButton. Referring to FIG. 7, in step 202 the PDA sends a command to store a message.

The command includes the size of the message to be stored on the iButton. In step 204, the message M is split into N packets, each of size Mi. In this case the size of the packets is 110 bytes. Then the packets are transmitted individually, for each i=1 to N, in step 206. When the Nth packet is transmitted, the routine ends in step 208. In step 208, the routine sends an APDU (application protocol data unit) containing the Mi packet. In step 212 the routine waits a period of time to allow the iButton to store the packet Mi. In step 214 the routine requests the state of the iButton. If the state is not packet processed in step 216, the routine waits. If the state is packet processed, an APDU reply indicating successful or failed stored is sent to the PDA. If the storage failed, an error message is sent in step 222. If the packet is stored successfully at step 220, the routine loops back to step 206 to transmit the next packet.

The pollen network is less expensive than traditional networks to establish. First nodes in the pollen network can be added or removed trivially, with almost zero administrative overhead (apart from initializing the iButton appropriately and affixing it to the device). An advantage in using iButtons in the pollen network is their ease of installation and lack of maintenance. Once an iButton is affixed to a device and the basic pollen environment (program or operating routine) is installed on it, nothing more need be done since all further updates can be carried out as part of normal pollen operation (i.e., a user can download an application update during a regular PDA visit).

Second nodes can similarly be added or removed easily. PDAs are ubiquitous and relatively inexpensive to acquire; many people carry them around as part of their everyday life. To join a pollen network, a user with a PDA need only download the pollen network software and dedicate a portion of the PDA memory for pollen network use. PDAs are standard products, so users benefit from economies of scale and a wide range of software and accessories.

A pollen network with one or more hives (third nodes) is also relatively easy to add or remove. The hive is not necessary for the pollen network to operate. As noted above, the hive allows for storage of larger numbers of messages and can be used to increase the throughput and efficiency of pollen transport by learning user routes.

The Pollen network is an infrastructure which enables new applications in support of these workplace scenarios, as well as others in different environments, such as the home, the factory, or retail settings. Users may belong to multiple decentralized network systems. In offices, there may be several decentralized network systems having overlapping members. These decentralized network systems may even extend among multiple buildings or physical sites.

In addition to the infrastructure of PDAs and iButtons, the pollen network could be expanded by the addition of an infrared infrastructure. An IR infrastructure in addition to the pollen network would allow more continual connectivity. For example, devices with infrared ports could replace iButtons to allow contactless exchange of Pollen. PDAs with infrared ports (such as Psions and Palm Pilots) could directly exchange pollen messages via infrared. Also infrared transceivers could allow PDAs to communicate with the hive or other servers. Infrared networks have been put in place as research testbeds in support of mobile workers and do not require physical docking.

Figure 3:
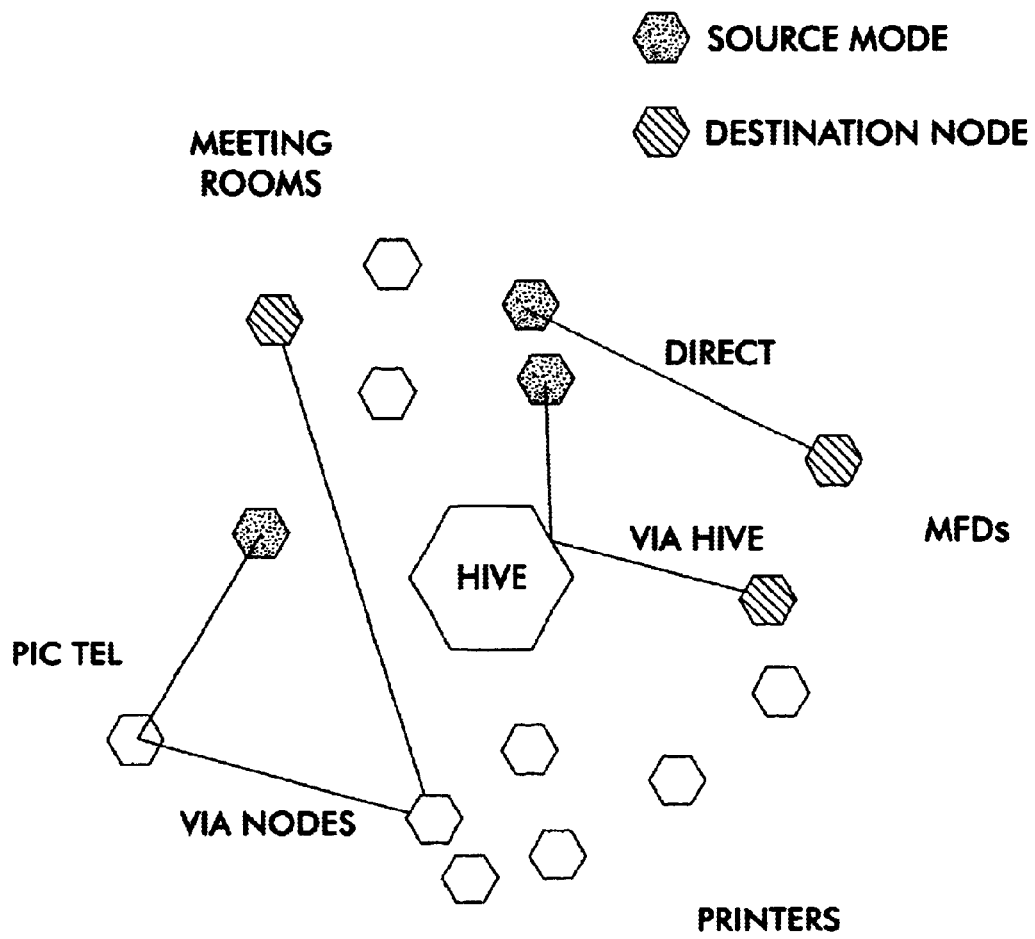
FIG. 3 is a schematic showing example message transfers in the network system of FIG. 1.

Messages are transmitted in the pollen network from one arbitrary node to another in the pollen network by a sequence of exchanges between first nodes and second nodes, between second nodes and second nodes, and between second nodes and the hive (if the hive is present). Referring to FIG. 3, a message can be passed between two arbitrary nodes in any of several ways. First, a user can carry a message from a source node 34 on his/her wearable computer directly from one node attached to one device to another node attached to the destination device 36 (path 42). Second, the message can pass through intermediate nodes 38, carried from node to node by a number of different users (path 46). Third, the message can pass through the hive 50 on its way to another node; one user deposits the message at the hive when docking and a second user picks it up later when docking (path 44).

Pollen

An important aspect of the pollen network is the pollen or the messages that are transmitted on the network. Each message or pollen includes content and must also have a state associated with it. Preferably, the pollen state is new, in transit, delivered or expired. Both the iButtons and the PDAs have software that changes the state of the pollen in accordance with a pollen state machine.

The pollen state machine controls the evolution of the state of the pieces of pollen. The possible states are: new, in transit, delivered, deleted and expired. A piece of pollen that has just been created by a user is marked as new. A piece of pollen that has been picked up from a first node site and has not yet arrived at all of its destinations, is marked as in transit. A piece of pollen that has been delivered to all of its destinations is marked as delivered. The piece of pollen is marked as delivered when it is known to have arrived at all of its destination nodes; otherwise, it is marked as in transit. When the current date is greater than the piece of pollen's expiration date, its state is marked as expired. A piece of pollen that has been manually deleted by a user is marked as deleted. (Pollen may be deleted when expired or when delivered and not needed at the destination.)

Figure 4:
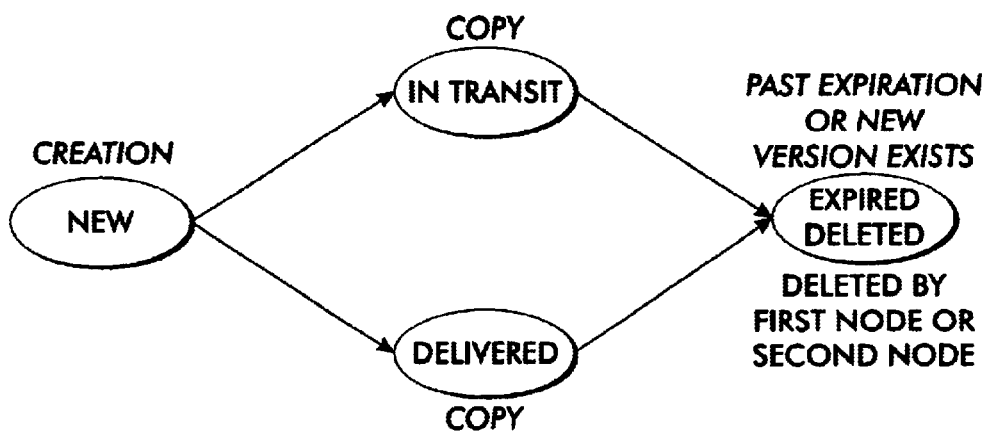
FIG. 4 is a diagram of a pollen state machine.

The state transition diagram for pollen state is shown in FIG. 4. It should be noted that the state of a piece of pollen is independent of the state of the various copies of that piece of pollen. In other words, this state transition diagram is for the differentiated delivery scenario. When a copy of a piece of pollen is made, its state is new.

In the preferred embodiment of the decentralized network system, in addition to the particular user specified or user created message content, the messages, or pollen, have the following properties. Each pollen or message will have a unique pollen identifier. Users may, of course, specify a priority of the pollen message. Since memory size of both the PDA (wearable computer) and the iButton (device miniature computer) will be critical, size in bytes of the pollen is specified.

Each pollen will also include a timestamp, i.e., the date and time of creation of the pollen message, an expiration date (which may be a default value, a user-specified value or none) and/or a time-to-live (TTL), the source site (where the pollen originated) and destination site (where the pollen message is intended to be received). Each pollen will include a message that will include content, i.e., data, information or an application program such as an applet. Preferably each pollen will include a class field which will designate the type of message content (either message or application program). This will enable the recipient or a transmitting node to decide whether to download the message or not. Preferably a field is provided to the author's name (typically the user ID assigned by the system) or it will indicate the author is anonymous. A field for designated recipients may also be included. Recipients may be designated as all, or a member of a particular group or by specific user ID.

First Nodes

First nodes are associated with a device or a location. Preferably the Java iButton is used, although any suitable device with a dedicated memory, communications port and optional processor may also be used. Most first nodes will be attached to a fixed device, such as a printer or facsimile machine, but others may be attached to a book or piece of video equipment, which may be moved from location to location. The processor in the iButton or miniaturized computer is loaded with software that enables storing and exchange of messages with second nodes (the wearable computers or PDAs) in accordance with a predetermined relationship. Stored with the iButton memory is data that identifies the first node and its particular properties.

Due to the limited memory size of the first nodes and the capability of the processor, and in particular the iButton, the pollen messages were designed to understandable by multiple platforms. This is accomplished through the use of a specific object called SerialRepresentation. The serial representation represents the electronic form of the particular pieces of pollen that travel on the pollen network. A class was created that provides a structure and a set of tools that serialize basic data to transport on the pollen network. This class allows the coding and decoding of the pollen messages. All messages that travel on the pollen network must decode and encode a SerialRepresentation object without loosing information.

Preferably, each first node is assigned a unique identifier or node ID. A field indicates the size of the node's memory or cache size (in bytes). This information is used by the first node software program in determining which messages to accept, delete and store. A field is provided to indicate the class of the node, i.e., device or room (location). Sub-fields are provided to indicate more details concerning the device, for example, whether the device is a printer, facsimile, telephone, PicTel, ED. Similarly, a field is provided for locations to indicate type, i.e., office, meeting room, reception, library. Another field provides the physical location of the device or room in terms of physical coordinates. If only certain users may have access to the first node's device, a field is provided for public and private keys to enable encrypted pollen exchanges. All of this information is encoded in the various fields of the SerialRepresentation class.

Second Nodes

Second nodes are wearable, portable computers, such as personal digital assistants and carried or worn by users. The processor in the PDA or wearable computer is loaded with software which enables creating, storing and exchange of messages with first nodes and with other second nodes, or a hive if one is present in the network. Stored within the PDA memory is data which identifies the second node and its particular properties. Preferably, each second node is assigned a unique user identifier or user ID. Since PDAs are associated with a person, a field for the user's name may be included. Also included is information to enable encrypted pollen exchanges, public and private keys. Since memory size is also limited in PDAs, a field is provided to show cache size (in bytes).

Hive

To add increased flexibility and administration, a decentralized network system will include at least one hive. The hive consists of a shared dataspace and a set of processes. The shared dataspace saves the current state of all users (i.e., all second nodes), all first nodes, and all pieces of pollen (to the extent it has received knowledge of same by information uploaded from docking first nodes). The hive contains a process for updating a user's pollen cache and updating its own dataspace upon docking of the user PDA with the hive through a workstation. It may also contain processes that learn the traffic patterns of users moving among nodes. By learning these traffic patterns, the hive may be able to employ more intelligent schemes for updating users' pollen caches, for example, giving pieces of pollen to users most likely to take them to their destination site(s). At a more global level, people monitoring traffic patterns might realize that physical modifications of the network infrastructure (e.g., move the copier down the hall) could lead to more efficient traffic patterns, too. The hive may also contain processes that trigger actions based on observed traffic patterns and message contents (using linguistic analysis). An example of this is a trigger that notifies support personnel when there is unusual activity between printer nodes and words like "failure" or "crash" occur.

Figure 6:
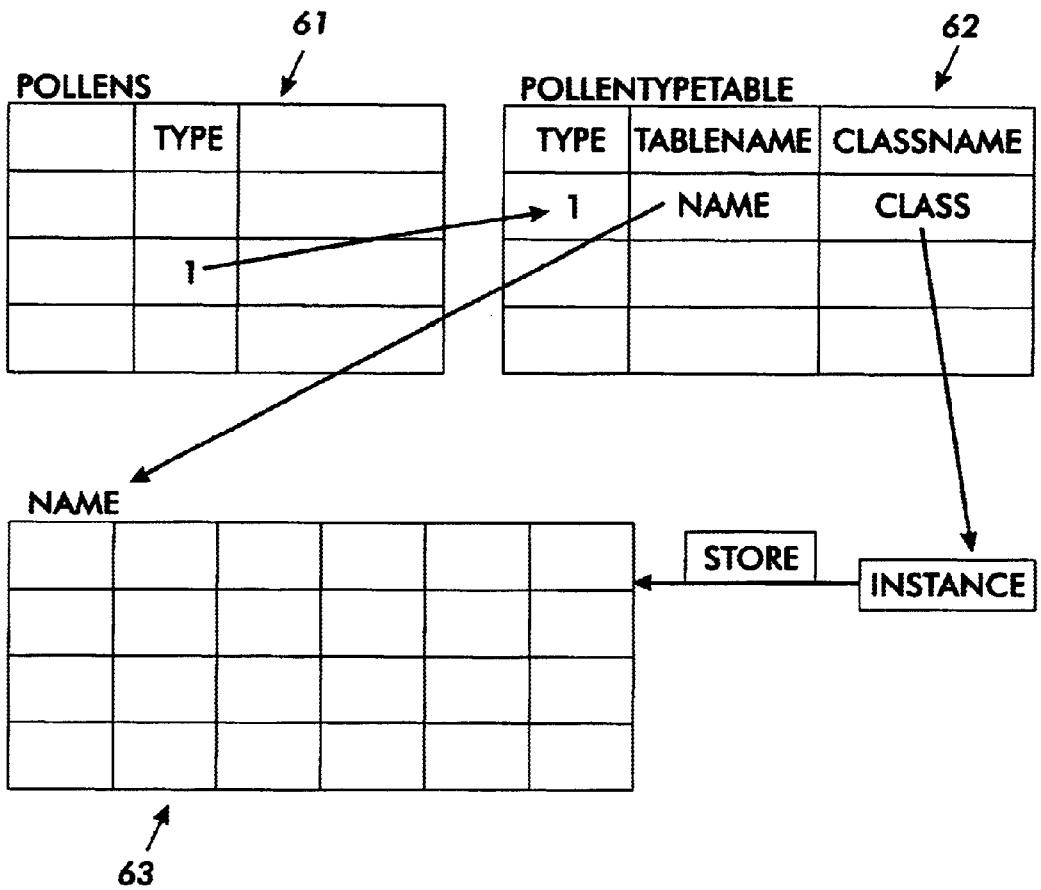
FIG. 6 is an example of a hive database.

The hive may include a database which includes the tables shown in FIG. 6. Referring to FIG. 6, the hive database includes three main tables. The pollen table 61 stores pollen messages transmitted in the pollen network. The user table 63 stores the users (and their associated second nodes) in the pollen network. The log table 62 stores the number of connections between a given second node and a given first node. Table 62 is used during synchronization between a second node and the hive.

Pollen Methodology

The pollen methodology describes the exchange of pollen between the different elements in the pollen network: the user PDAs, the first nodes and the hive. The pollen methodology regulates how users drop and pick up pollen at the nodes and at the hive. Additionally, each first node and each second node includes methodology specific to that node's operation. The exchange of pollen is complicated by a number of factors: (1) the various processing and memory limitations of the PDA and the iButtons; (2) the limitations in the communication bandwidth between the PDA and the iButtons; and (3) the requirement of the state machine to perform the changes in state of pollen.

PDA Methodology With the First Nodes

The pollen methodology for the PDAs describes how pollen is dropped off and picked up at first nodes (iButtons) and the hive (if a hive is included in the pollen network) and is preferably implemented as an application program running in the PDA processor. Two possible variations in the methodology describe the interaction at first nodes. The first assumes that the weakest link in the overall methodology, in terms of processing power and memory size, are the iButtons affixed to the first nodes.

When a user connects his/her PDA with a first node (iButton), the PDA program reads from the memory of the iButton headers of all pollen stored in the memory of the first node and the header of the first node. The header of the first node includes the size of the first node's memory, which information is needed in order for the PDA program to determine which pollen to store and which to delete, if any. Pollen headers contain a limited amount of information about the pollen, for example, pollenID, copy number, state, version, priority, size, timestamp. Headers for the first node typically include nodeID and cache size.

The PDA program constructs a list of the pollen IDs in both the PDA and the iButton, including any new pollen just created by the user. The PDA program first schedules for deletion at the first node, pieces of pollen which ID matches an ID on its list of deliveredIDs (the IDs of pollen that have been delivered to all destination nodes) or flushIDs (the IDs of pollen that have expired). Using the information in the pollen headers and an evaluation function, the PDA program sorts the pollen in inverse order of priority, with highest priority pollen first. The evaluation function takes into account the recency of the pollen, its user-set priority (if it exists), and the class of the device.

Class of the device is considered as a way of differentiating tasks. A printer first node can be configured to give preference to pieces of pollen having to do with printers. A separate application in the iButton of the printer could use the pollen to keep track of the current state of printers and indicate to users alternative printers when its host printer is down. Similarly, a meeting room iButton could suggest available meeting rooms when its host meeting room is occupied.

From this rank-ordered list, the PDA program chooses which pieces of pollen to save and which to delete, for both the PDA cache and the iButton cache. When deciding where to draw the line, the PDA program takes into account the memory size of each piece of pollen and the memory size of the respective caches. In general, the line between saving and deletion will be different for the PDA and the iButton as the sizes of the corresponding caches will be different. However, the division is consistent, assuming a common evaluation function: the set of pollen to save in the device with the smaller cache is always a subset of the set of pollen to save in the device with the larger cache.

If the PDA cache is larger than the iButton cache, the PDA program triggers the deletion of the items in the PDA-to-delete-list, picks up from the first node the pieces of pollen in the PDA-to-save-list that reside in the node. The PDA pollen-state-machine updates the state of these pieces of pollen. The PDA program also triggers the deletion of the items in the iButton-to-delete list, transfers to the node the pieces of pollen in the iButton-to-save-list that reside in the PDA. Before transferring these pieces of pollen, the PDA pollen-state-machine updates the state of these pieces of pollen, and updates the deliveredIDs of the PDA.

If the iButton cache is larger than the PDA cache, the PDA program triggers the deletion of the items in the iButton-to-delete-list, transfers to the first node the pieces of pollen in the iButton-to-save-list that reside in the PDA. Before doing the transfer, the PDA pollen-state-machine updates the state of these pieces of pollen both locally and remotely, and updates the deliveredIDs attribute of the PDA. The PDA program then triggers the deletion of the items in the PDA-to-delete list, picks up from the first node the pieces of pollen in the PDA-to-save-list that reside in the first node. The PDA pollen-state-machine updates the state of these pieces of pollen both locally and remotely. If the user desires to store a new pollen message, and there is sufficient memory space available on the iButton, the method described with reference to FIG. 7 (above) may be used.

The second methodology for handling the interaction of second nodes at first nodes assumes that the weakest link is the communication time between PDA and first node. In this case, the methodology should be modified somewhat to minimize communication time. In this second methodology, when a user connects with a first node iButton, the PDA program picks up headers of all pollen at the first node and the header of the first node. The node program picks up headers of all pollen in the PDA, the deliveredIDs list in the PDA and flushIDs list in the PDA. Both the PDA program and the node program create ordered lists of pollen, using a pollen evaluation function, as described in the previous methodology.

If the PDA cache is larger than the iButton cache, the PDA program triggers the deletion of the items in its PDA-to-delete list, picks up from the node the pieces of pollen in its PDA-to-save-list that reside in the node. The PDA pollen-state-machine updates the state of these pieces of pollen both locally and. The iButton program triggers the deletion of the items in its iButton-to-delete list, picks up from the PDA the pieces of pollen in its iButton-to-save-list that reside in the PDA. The PDA program updates its deliveredIDs attribute.

If the iButton cache is larger than the PDA cache, the iButton program and finite state machine operate first, then the PDA program and finite state machine operate.

In order to reduce the communication time even more, part of the memory caches for the PDA and iButton could be reserved as a buffer. This would allow a complete exchange of pollen before doing any deletion. However, the exchange of all pollen might actually require more communication time than is entailed by the pre-processing done by the pollen-deleting that can act solely on the basis of the exchange of pollen-headers.

Figure 5:
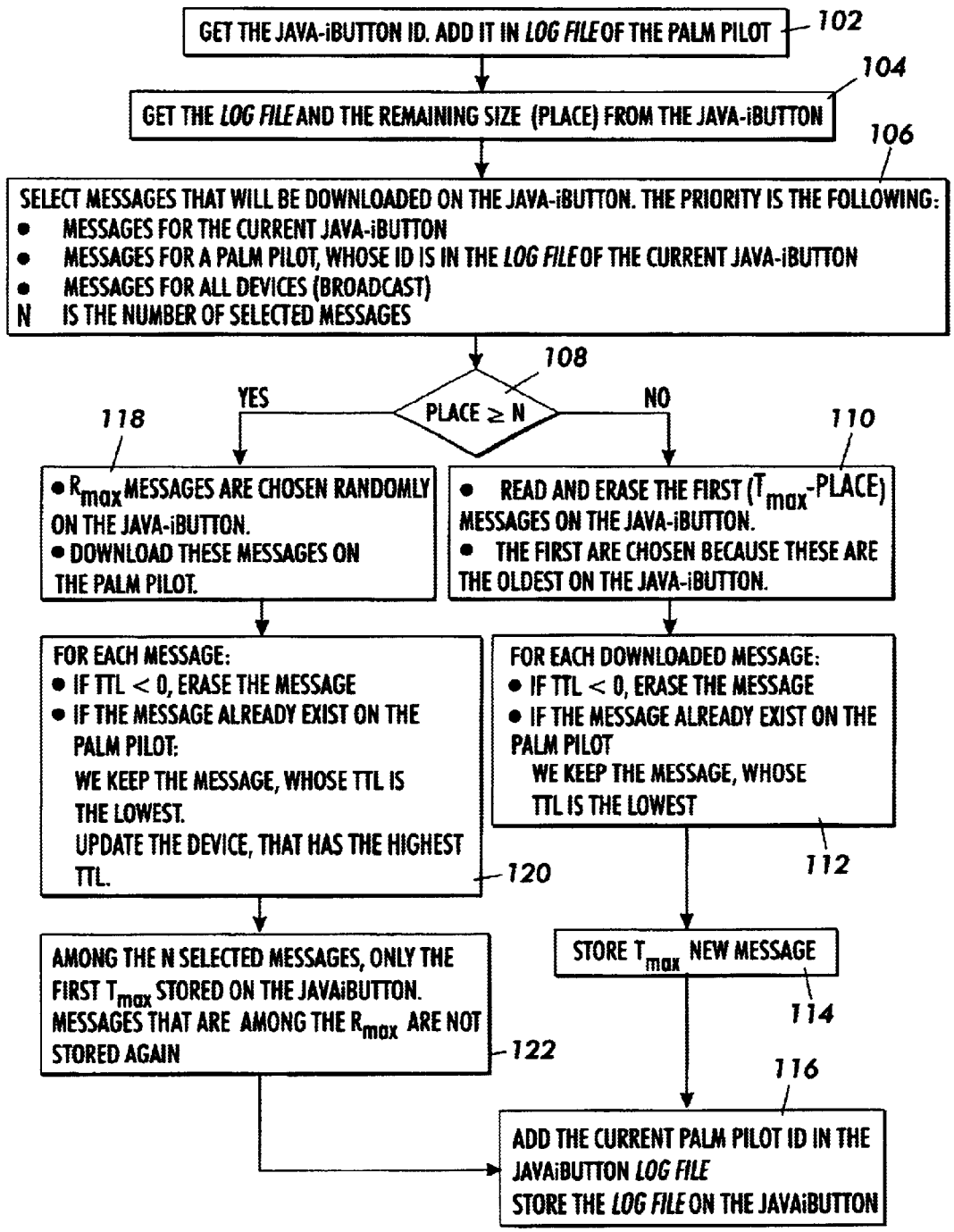
FIG. 5 is a flowchart of the synchronization routine of a second node when docking with a first node.

A method of synchronizing exchange of messages between a first node and a second node is shown in FIG. 5. In this method, the PDA stores a log for later use when docking with a hive (see below). After connecting with the first node (in this case an iButton), in step 102 the PDA gets the iButton's ID and adds it to the log of first nodes visited. In step 104 the PDA then gets the log file stored in the iButton and the remaining memory (called Place). In step 106 the PDA applies an algorithm or method for determining which messages to download onto the iButton and which messages to upload from the iButton.

Messages will be downloaded onto the iButton, in this example, in accordance with the following priorities: messages specifically for that iButton, then messages for a second node in which the second node's ID is stored in the iButton's log file, and then general broadcase messages. N is the selected number of messages to download.

In step 108, the PDA determines if place (the available space on the iButton to store messages) is greater than or less than the number of messages to be downloaded. If place is greater than or equal to N, in step 118, the PDA randomly choses Rmax messages on the iButton and uploads these into the PDA's memory. In step 120, for each message uploaded, the PDA determines whether to erase it or save it. If the time to live (TTL) is less than zero, indicating the message has expired, the PDA erases the message. If the message already exits in the PDA's memory, the message with the lowest TTL is kept on the PDA memory. In step 122 among the N messages selected to downloand onto the iButton, only the first Tmax (where Tmax is the maximum number of messages that can be stored on the iButton memory) are stored on the iButton. Messages that are duplicated among the Rmax are not stored again.

In step 116, the PDA stores its own ID into the iButton log file and then restores the log file onto the iButton memory.

If place is not greater than or equal to N, in step 110, the PDA reads and erases the first (Tmax-Place) messages on the iButton. The first are chosen because they are the oldest on the iButton. In step 112, for each downloaded message, if the TTL is less than zero, the message is erased. If the message is already stored on the PDA memory, the version with the lowest TTL is kept. In step 114, the PDA stores Tmax new messages on the iButton. In step 116, the PDA adds its ID to the iButton's log file and downloads the updated log file into the iButton's memory.

PDA Methodology With Hive

In order to participate in a network with a hive, various additional information pertaining to delivery and processing of messages is stored in a log or fields in the PDA (as noted above). If the second node is part of a decentralized network system having a hive, a list of pollen IDs delivered since last hive visit is stored, as well as a list of pollen IDs to be flushed network-wide.

Each time that a PDA synchronizes its pollen with pollen stored in an iButton, the address (or identifier) of the Button is stored in the "log file" on the PDA. During the synchronization with the hive, this log file is read and a table in the hive database is updated. So, statistics can be made to estimate the probability for a message to be delivered if is loaded on a specific PDA.

When a user connects his/her PDA with the hive, the hive program picks up all pollen in the PDA and the identity of the PDA. The hive updates its central pollen memory to include those pieces of pollen in the PDA with a pollenID unknown to the hive (makes a copy and stores in the hive memory). Pieces of pollen already known to the hive are synchronized with the pieces on the PDA. The state of the piece of pollen is updated according the pollen state machine, both in the hive and in the PDA. In particular, the hive keeps track of which pieces of pollen have been delivered to all of their destinations and which pieces have expired.

During the synchronization, each record from the PDA is compared with a copy stored on the hive (if the copy does not exists, this copy is created on the hive). The copy, which has the smallest time to live (TTL) field, is considered as the most up-to-date and will be stored on the hive and on the PDA. During this "jump", the TTL field of the message that is moving is decreased. The messages are now updated. In a second step, messages that do not exist on the PDA are loaded on the PDA. Messages whose destination is the PDA are loaded with top priority, then messages with destinations to second nodes previously reached by this PDA, then messages with a broadcast address.

The hive keeps track of which pieces of pollen have been delivered where and updates the deliveredIDs attribute (list) of the PDA. The hive keeps track of which pieces of pollen have expired and which pieces of pollen have been flushed (and where) and updates the flushIDs attribute (list) of the PDA.

The hive schedules PDA pollen for deletion and hive pollen for insertion according to a PDA-specific evaluation function (function of PDA role and identity of its user). The hive schedules for update pieces of pollen that were synchronized in the previous steps. The schedule of actions is then performed.

Messages are transmitted in the decentralized network system according to the relatively random, distributed nature of the movement of the users. In a network with a hive, the hive can learn the relatively random patterns of the users to select which users to download particular pollen to. The delivery of messages in the decentralized network depends on having relatively large numbers of users with relatively random patterns that overlap sufficiently to enable delivery of all messages to their destination. First nodes and second nodes each have program resident on their processors with a set of rules for storing, copying and uploading messages. These rules take into account the limited size of the memory in each.

In the case of the hive, the hive has a much larger memory and is able to transfer all messages from each PDA that connects with it. The hive simply takes all the messages stored on the docked PDA and saves those it has not seen before. If the hive receives a message that it has already seen, it saves the latest version (as approximated by the time to live field of the pollen).

Messages can either be addressed to a specific device (PDA or iButton) or can be marked as broadcast (and thereby distributed to all devices on the network). Given the limited memory on the PDA, the hive rules must carefully select which messages should be transferred to a particular PDA in order to make the best use of the available bandwidth. Messages addressed to a specific device are treated as a higher priority when deciding which messages to transfer to a PDA. Since the number of possible delivery routes may be restricted, it is important to ensure that the message will be carried by those PDAs most likely to come in contact with the recipient destination. The hive methodology, which is preferably implemented in a software program executed on the hive processor, first selects specifically addressed messages and then broadcast messages.

The hive program assumes that each PDA logs the following information: all pollen that they have come in contact with since last synchronization with the hive; and all devices (other PDAs, iButtons) that they have come in contact with since last synchronization. These logs are downloaded to the hive database on synchronization and used to allow analysis of traffic patterns and to predict which nodes a PDA is most likely to visit.

Figure 8:
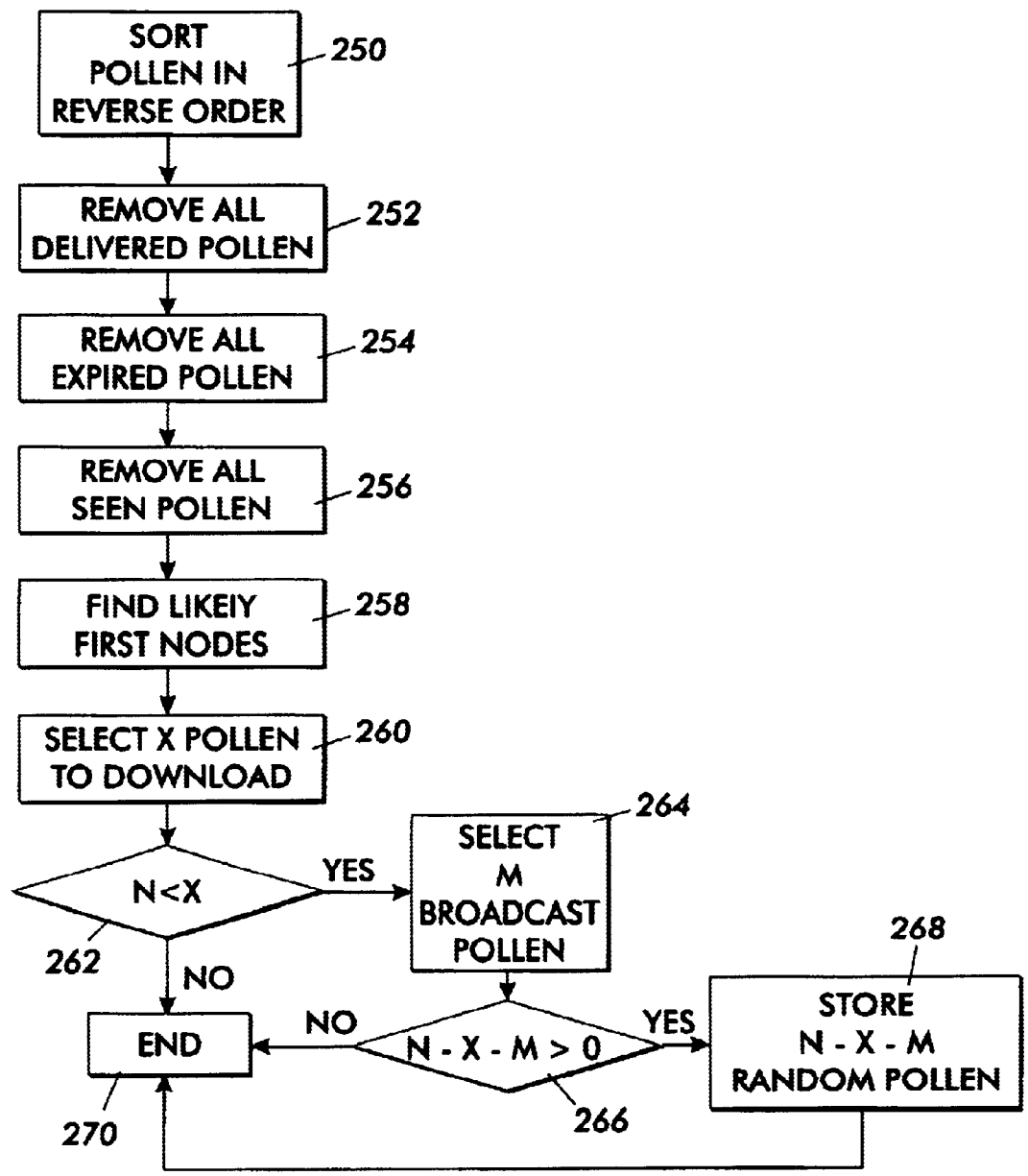
FIG. 8 is a flowchart of the hive methodology for tracking messages in the pollen network.

The hive also maintains a circular queue of all current broadcast messages. The methodology for selecting pollen grains assumes that each PDA has space for N grains of pollen (individual messages). Referring to FIG. 8, the hive methodology includes the following steps:

In step 250, sort pollen grains in reverse order (least first) of number of times that they have been transferred from the hive to a PDA. This gives priority to grains which have originated on hive-based applications and are not already out in the network and to grains which have not been disseminated widely (at least from the hive).

In step 252, remove all grains that are known to have been delivered from the candidate list.

In step 254, remove all grains that have expired from the list.

In step 256, remove all grains which the docked PDA has already seen.

In step 258, find the nodes that the PDA is most likely to visit, based on stored logs from other docked PDAs.

In step 260, select the first grains on the candidate list whose destinations are nodes that the docked PDA is most likely to visit.

In step 262, check if less than N grains have been selected. If X is the number of grains already selected in step 264, then select up to the first N–X grains from the broadcast queue and move the selected grains to the end of the queue. If less than N grains are selected, then in steps 266 and 268 select the remainder at random from the first M grains of the candidate list. End in step 270, where the results are downloaded onto the PDA's memory.

The behavior of the pollen network (decentralized network system) was evaluated to determine the probability $P_{ij}$ (t) that a message originating at node i arrives at site j within time t. The probability was evaluated to determine how it depends on typical PDA-node and PDA-hive interaction rates and how it depends on the physical topology of nodes. Since multiple copies of messages may be made (redundant pollen), the issue of redundancy in the network was also evaluated in terms of, on average, how many copies of a piece of pollen arrive at their destination within time t (on order of the expiration time). The number of copies of pollen per piece of pollen are made, on average, was also evaluated, as well as the converse, how many pieces of pollen get lost en route to their destination?

In order to model and simulate the pollen network certain simplifying assumptions were made as well as certain parameters defined. First, i and j are used to index pieces of pollen and x to index users. Each piece of pollen is assumed to be about the same size. Priority of pollen is determined by recency. Individual users all interact at the same rate, $\alpha$, on average, with the pollen network of first nodes. This means that on average, the time between node interactions for each individual is $1/\alpha$ time units.

Individual PDA-node and individual PDA-hive interactions are modeled as exponentially distributed events, i.e., the time until the next interaction of an individual with a first node (iButton) in the network is distributed as $D(t)=\alpha \exp(-\alpha t)$. Note that this is a memory-less distribution: future events are independent of past events. However, a distribution with memory could also be considered (although computationally more difficult to complete); individual-node interactions will tend to cluster together in time with long pauses in between clusters. Alternatively, this behavior may emerge due to the topological nature of the pollen network as modeled by the $S_{ij}$ (see table below).

The time, $\tau_{ij}$, individuals take to move between first nodes is assumed to depend only on the nodes, not on the individual. It is also assumed that this time is less than the time $1/\alpha$ between subsequent node interactions. $\tau_{ij}$ acts as a delay; pieces of pollen arriving at a first node are always delayed by at least this amount with respect to the true state of the network.

Individual users all create new pieces of pollen at the same rate. For this embodiment, it is assumed that only individual users create pollen, not first nodes (nor the hive). It is also assumed that all first nodes have a finite caching memory and the hive memory is large enough to cache everything downloaded. A new version of a piece of pollen is treated simply as a new piece of pollen in this embodiment.

Parameters are set forth in the table below.

| | |
|---|---|
| n | Number of first nodes |
| z | Number of carriers (users). |
| $K_{carrier}$ | Maximum number of pieces of pollen carried by each carrier (user). |
| $K_{node}$ | Maximum number of pieces of pollen cached by each node. The hive has infinite capacity. |
| $\alpha$ | Average rate at which individual user decides to switch between first nodes in the pollen network. |
| $\tau_{ij}$ | Time it takes for an individual to move between nodes. $\tau_{ij} < 1/\alpha$. May be a function of physical distance between the nodes. |
| $1/\gamma_i$ | Time constant for expiration of pieces of pollen. $\gamma_i$ is the relaxation rate for node i. |
| $p_x$ | Probability that an individual user will create a new piece of pollen at a node after having moved to that node. Average rate at which individuals create new pollen is then $\eta = p_x \alpha$. |
| $S_{ij}$ | Strength of interconnectivity between node i and node j. As these weights correspond to probabilities of moving from one node to another, the sum of each column in the matrix is equal to 1. The weights may be a function of: physical distance and/or class of node. (Hive is treated as a special node.) Alternatively, can be modeled as a random matrix which columns sum to 1. |
| $P_{ij}^x(S_{ij})$ | Probability that user x moves from source i to source j. In the simplest case, $P_{ij}^x = S_{ij}$. |

The pollen network model can be approximated by a spreading activation net if it is assumed that: $P_{ij}^x = S_{ij}$ (The pollen network appears the same from each user's point of view) and there is no practical constraint on the maximum number of pieces of pollen at a first node or in a PDA.

A spreading activation network consists of a set of nodes, tagged by their level of activity, with weighted links between them. These weights determine how much the activation of a given node directly affects the other nodes. The behavior of the network is controlled by a number of parameters that describe the topology of the network, the weight of the links between the nodes, the relaxation rate with which the activity of an isolated node decays to zero, and the amplification rate which controls the amount of activity that flows from a node to all of its neighbors per unit time.

The following table describes the parameters in the activation network and how they map onto the parameters of the pollen network.

| Activation net | Description | Pollen network model |
|---|---|---|
| $\mu$ | Gives the average number of links per node; specifies the topology. | z/n = carriers/node |
| S | Matrix of the weights of links between nodes; diagonal elements are zero; $S_{ij}$ is the weight of the link from node i to node j. | S |
| $\alpha$ | Amplification rate: relative amount of activity that flows from a node to all of its neighbors per unit time. | $\alpha$ |
| $\gamma$ | Relaxation rate: rate at which activity of isolated node decays to zero, ranges between 0 and 1. | $\gamma$ |
| C | Vector whose elements specify the external source per time step. This is the average number of pieces of pollen created per node per unit time. | $\alpha p \times z/n$ |

Nodes in an activation network are initially (or continually) activated by external inputs. These nodes in turn cause others to become active with varying intensities, leading to complicated dynamics characterized by a spatio-temporal modulation of the total net activity. There are two general questions to be raised with respect to the behavior of the network. The first one concerns the rate at which equilibrium is reached and how this compares with the characteristic times with which inputs change at the sources. The second question deals with the extent to which the far regions of the net influence the parts under consideration. Huberman & Hogg (1987) show that there exist several operating regimes separated by sharp boundaries. These operating regimes can shed light on the expected behavior of the pollen network.

The dynamics of the spreading activation net can be specified in discrete time steps. Let A(N) be a vector whose ith element is the activation of the ith node at time step N. Using the standard model of activation plus relaxation, the time evolution of a net with zero information delay ($\tau=0$) is given by $$A(N) = \frac{\alpha z}{n} p + MA(N-1), \quad (1)$$

where M is a matrix determined by the connectivity. It can be written as $$M = (1-\gamma)I + \alpha S,$$

where I is the identity matrix. The total activation of the net, T(N), is the sum of the elements of the vector A(N). Recall that the sum of the elements in each column of S sums to 1, i.e., $$\sum_j S_{ij} = 1. \quad (2)$$

Equation (1) completely determines the dynamics of the spreading activation net if the sources and initial conditions are specified. Huberman & Hogg consider the spread of activity through the net due a constant source applied to a single node. They find a transition when $\gamma=\alpha$. For values of the activation larger than the decay, the net experiences explosive growth in activity. Conversely, when the decay per node always exceeds its activation, the activity settles down to a finite value.

From (1) and (2) the total activation evolves according to $$T(N) = \alpha z p + (1-\gamma+\alpha)T(N-1). \quad (3)$$

When the decay is larger than the amplification, this approaches a fixed limit $$T^* = \frac{\alpha z p}{(\gamma - \alpha)}. \quad (4)$$

Furthermore, the number of nodes activated dies out with the distance from the source. Conversely, if the decay is smaller than the amplification, the total activation grows without bound and the fixed point is unstable. This result points towards choosing expiration delays longer than the typical time between node visits in the pollen network to enable remote nodes in the network to affect each other. However, we can then expect node memories to become saturated, the effect of which is not taken into account by the spreading activation model.

When the system is unstable, the activity grows exponentially like $\exp(N/\delta)$ where $\delta$ is given by $\delta = 1/\ln(1-\gamma+\alpha)$. Recall that $\gamma$ is between 0 and 1. This means that the activity grows most rapidly when the decay rate is small (i.e., long expiration delays) in comparison with the amplification rate. As the decay rate approaches the amplification rate from below (short expiration delays), the spread of activation becomes more and more sluggish.

Huberman & Hogg also discuss the effect of topology on the dynamics of spreading activation networks. A typical network can be simply modeled as a random graph with the constraint that, $\mu$, the average number of edges leaving a node is constant. The simplest case is the one in which the weights on all the links leaving a node are equal. This implies that $S_{ij}=1/\deg j$ whenever the nodes i and j are linked and where deg j is the number of links leaving node j. In this case the matrix S entering the dynamical equations is a random one whose off-diagonal elements are nonzero with probability $\mu/(n-1)$. Note that in this model any two nodes are equally likely to be connected, unlike in physical situations where the strength of the connection between two nodes is likely to decrease with distance between them and perhaps have a dependency on the similarity of the classes of the two nodes.

When $\alpha > \gamma$ (the expiration time is greater than the average time it takes for activity to pass from one node to its neighbor), there is a phase transition about $\mu=1$ where the topology of the network suddenly changes from small isolated clusters to a giant one containing very many nodes. For the pollen network, this implies that the network will be connected when the number of carriers, z, is greater than the number of nodes, n. (Recall that $\mu=z/n$.) The existence of giant clusters allows the activation to reach arbitrarily remote regions of the network. The event horizon extends both in time and in space.

The phase transition results are obtained in the limit of infinite size activation nets. The finite size of a real network smoothes out the transition. The larger the network, the more abrupt the transition about $\mu=1$. Also, as the dynamics are very sluggish about $\alpha=\gamma$, in a real system it may be hard to distinguish between continued activity growth and eventual reaching of the fixed point near this transition point.

In the pollen network, to enable remote first nodes in the network to affect each other, expiration delays should be longer than the typical time an individual user takes between first node visits. The characteristic time constant of the pollen network is on the order of $\delta = 1/\ln(1-\gamma+\alpha)$. This gives a basis for estimating how long it will take pieces of pollen to percolate to their destination. The longer the expiration delays with respect to the typical second node-first node transport time, the smaller the characteristic time constant. The minimum is $\delta = 1/\ln(2)$ in the limit of infinite expiration delays and quasi-continuous transport.

The number of carriers (i.e., users), z, in the pollen network should be greater than the number of first nodes, n, (iButtons) to ensure that arbitrary regions of the pollen network remain topologically connected. However, the effective number of nodes in the network may be smaller than the physical number, if some nodes are much more frequently visited than others. In the same way, the effective number of users may be smaller than the official number.

Spreading activation nets do not take into account the uniqueness of pieces of pollen. In an activation net it is possible to have positive feedback loops of increasing activation between two nodes. In the pollen network, this kind of behavior is checked as there will be at most one copy per first node of the same version of a piece of pollen. Also, as stated, we can expect first node and PDA memories to become saturated, the effect of which is not taken into account by the spreading activation model.

An alternative model of the pollen network was evaluated. In this alternative model, each PDA (actually the user) chooses next first node to visit according to a uniform distribution over the first nodes. PDAs move from first node to first node in a time modeled by an exponential distribution. When a PDA arrives at a first node, beside the exchange of pollen grains between the PDA and the node, it (actually the user) might decide to create a pollen grain according to a Bernoulli distribution. The created pollen grain chooses a target first node according to a uniform distribution. In order to animate this first model of network, a methodology called rumor spreading in the epidemiology literature controls the exchange of pollen between PDA and first node.

Rumor spreading is based on the following scenario. PDA and first node, when in contact, transmit to each other any pollen the other doesn't know yet. Once a first node or a PDA has transmitted a pollen grain k times, it stops spreading it. The analogy with epidemiology is that when a node or PDA is unaware of a pollen, it maps to a susceptible individual. When it knows about a pollen grain and spreads it, it is infective. While when it stops spreading it, it is removed. Actually this methodology is one of the numerous existing variants, known as rumor spreading with feedback and counter, which we use in a different context than in the epidemiology literature, as first nodes never spread rumor to first nodes, neither do PDA to PDA. This asymmetry unfortunately prevented us from directly reusing known mathematical results from the literature.

Additional differences exist as well: first, because we assign an expiration time to pollens grains, they might expire while their host is still in infective mode; second, because neither the PDAs nor the first nodes can hold an infinite number of pollen grains, because of the limitation of their cache size. We have preliminary simulation results, which tend to show acceptable delivery time and redundancy. Surprisingly, the delivery time distribution obtained experimentally appears to be a normal distribution while in epidemiology exponential distributions appear.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A decentralized network system, comprising:

a plurality of nodes including a plurality of fixed nodes and a plurality of mobile nodes;

wherein each fixed node includes a memory for storing pollen and a communications port for transmitting and receiving pollen and wherein each fixed node is associated with a device or location;

wherein each mobile node includes a memory for storing pollen, a processor for processing pollen in accordance with a predetermined relationship for creating, storing and handling pollen and a communications port for transmitting and receiving pollen, wherein the processor, responsive to a user input, generates a pollen;

wherein pollen is transmitted node by node across the network from a source node to a destination node, in the absence of a connection between the source node and the destination node, through a sequence of pollen exchanges between nodes resulting from relative random movement of mobile nodes and relative random interactions of mobile nodes with fixed nodes and other mobile nodes; and wherein pollen comprises content and information having a state representing the pollen's transmission status.

2. The system of claim 1, wherein each device is selected from the group of printer, facsimile, telephone, PicTel, MFD and book.

3. The system of claim 1, wherein each location is selected from the group of office, meeting room, reception area, library and building.

4. The system of claim 1, wherein a pollen's state is selected from the group of new, in transit, delivered and expired.

5. The system of claim 1, wherein each fixed node further comprises a processor for processing pollen in accordance with a predetermined relationship and wherein the predetermined relationship for processing pollen in each fixed node comprises rules for storing, retaining and discarding pollen based on relevance to the device or location associated with the fixed node.

6. The system of claim 1, wherein each fixed node further comprises a pollen state machine for modifying the state of the pollen, wherein each time pollen is transmitted to a subsequent node the state of the pollen is changed.

7. The system of claim 1, wherein each mobile node further comprises a pollen state machine for modifying the state of the pollen, wherein each time pollen is transmitted to a subsequent node the state of the pollen is changed.

8. The system of claim 1, wherein each pollen further comprises a unique identifier.

9. The system of claim 1, wherein each pollen further comprises information pertaining to a destination node.

10. The system of claim 1, wherein each pollen further comprises an expiration time.

11. The system of claim 1, wherein each first node comprises a programmable, miniature computer.

12. The system of claim 1, wherein each first node comprises an iButton.

13. The system of claim 1, wherein each second node comprises personal digital assistant.

14. The system of claim 1, further comprising a third node having a memory for storing pollen, a processor for processing pollen in accordance with a predetermined relationship and a communications port for transmitting and receiving pollen with the second nodes, wherein the processor, upon communicating with a second node, updates the status of any pollen stored in the second node's memory.

15. The system of claim 14, wherein the third node processor processes information pertaining to exchanges between pairs of fixed nodes and mobile nodes to obtain information pertaining to traffic patterns among the mobile nodes.

16. A decentralized network system, comprising:

a plurality of nodes including a plurality of fixed nodes and a plurality of mobile nodes;

wherein each fixed node includes a memory for storing messages, a processor for processing messages in accordance with a predetermined relationship based on relevance to a device or location associated with the fixed node and a communications port for transmitting and receiving messages;

wherein each mobile node includes a memory for storing messages, a processor for processing messages in accordance with a predetermined relationship for creating, storing and handling messages and a communications port for transmitting and receiving messages, wherein the processor, responsive to a user input, generates a message;

wherein a message is transmitted node by node across the network from a source node to a destination node, in the absence of a connection between the source node and the destination node, through a sequence of message exchanges between nodes resulting from relative random movement of mobile nodes and relative random interactions of mobile nodes with fixed nodes and other mobile nodes; and wherein a message comprises information having a state representing a transmission status of the message.

17. The system of claim 16, wherein a message's state is selected from the group of new, in transit, delivered and expired.

18. The system of claim 16, wherein the predetermined relationship for processing messages in each first node comprises rules for storing, retaining and discarding messages.

19. The system of claim 16, wherein each first node and each second node further comprises a message state machine for modifying the state of the message.

20. The system of claim 16, wherein each message further comprises information pertaining to a destination node.

21. The system of claim 16, wherein each message further comprises an expiration time.

22. The system of claim 16, further comprising a third node having a memory for storing messages, a processor for processing messages in accordance with a predetermined relationship, and a communications port for transmitting and receiving messages with the second nodes, wherein the processor, upon communicating with a second node, updates the status of any messages stored in the second node's memory.

23. The system of claim 22, wherein the third node processor processes information pertaining to exchanges between pairs of first nodes and second nodes to obtain information to traffic patterns among the second nodes.

24. A method for managing exchanges of messages in a decentralized network system, comprising:

a plurality of nodes including a plurality of first nodes and a plurality of mobile second nodes;

wherein each first node is associated with a device or location and wherein each first node includes a memory for storing messages and a processor for processing messages in accordance with a predetermined relationship based on relevance to a device or location associated with the first node;

wherein each second node is associated with a user and wherein each second node includes a memory for storing messages and a processor for generating and processing messages in accordance with a predetermined relationship for creating, storing and handling messages;

coupling a first node with a second node, said coupling resulting from relative random movement of second nodes and relative random interactions of second nodes with first nodes and other second nodes;

exchanging messages between the first node and the second node in accordance with each node's predetermined relationship;

wherein, when a messages is exchanged, the state of the message is changed.

* * * * *